United States Patent [19]

Spradling et al.

[11] Patent Number: 4,555,654
[45] Date of Patent: Nov. 26, 1985

[54] MEANS FOR REVERSING OPERATION OF A MOTOR

[75] Inventors: Gene V. Spradling; Terrence L. Stanek, both of St. Louis County, Mo.

[73] Assignee: Emerson Electric Co., St. Louis, Mo.

[21] Appl. No.: 604,070

[22] Filed: Apr. 26, 1984
(Under 37 CFR 1.47)

[51] Int. Cl.$^4$ .............................................. H02P 1/44
[52] U.S. Cl. ..................................... 318/751; 318/817
[58] Field of Search ............... 318/748, 751, 752, 754, 318/816, 817

[56] References Cited

U.S. PATENT DOCUMENTS 2,539,857  1/1951  Noodleman .......................... 318/754
2,847,629  8/1958  Schaefer ............................... 318/751

Primary Examiner—David Smith, Jr.
Attorney, Agent, or Firm—Polster, Polster and Lucchesi

[57] ABSTRACT

Means for selectively reversing the direction of rotation of a permanent split capacitor (PSC) motor is disclosed. This means comprises an "add-on" or retrofittable kit electrically connected to the motor windings externally of the motor. In an overhead ceiling fan application, the kit comprises a reversing switch installable in the fan housing stationarily mounted around the fan motor. The reversing switch is a two position switch serially connected to the normal fan on/off and speed control switch which is typically located in a switch housing stationarily mounted below the fan blades such that when the reversing switch is one position, the fan will rotate in one direction (e.g., clockwise), and when the reversing switch is in its other position, the fan will rotate in the opposite direction. With the reversing switch in either position, speed control and energization/de-energization of the fan motor may be effected by actuation of the on/off and speed control switch in the normal manner. With such a kit, so called "non-reversible" fans can be made to be reversible without the necessity of changing internal lead connections of the motor.

2 Claims, 3 Drawing Figures

U.S. Patent  Nov. 26, 1985  4,555,654

MEANS FOR REVERSING OPERATION OF A MOTOR

BACKGROUND OF THE INVENTION

This invention relates to means which may be connected to the windings of an electric motor, such as an overhead ceiling fan permanent split capacitor (PSC) motor, externally of the motor housing so as to permit the direction of rotation of the motor to be selectively reversed and so as to permit multiple speed operation of the motor in either direction of rotation.

In certain motor applications, such as in PSC overhead ceiling fan applications, it is desirable that the motor be capable of operating in either direction (i.e., either clockwise or counter-clockwise) so that the ceiling fan can be operated to move air in an upwardly or downwardly direction, as desired. Typically, the reversal of the direction of rotation of the motor shaft is accomplished by changing the connection point across opposite sides of the run capacitor in series with the auxiliary winding of the motor. However, many such non-reversible motors used for overhead ceiling fan applications were manufactured as multi-speed motors which had a plurality of windings connected in series with tapping points between the various main windings which could be selectively tapped by means of a multiple position speed selector switch. Certain of the motors had a different number of turns in one main winding than in the other main winding such that when the motor was operated in one of its preselected operational speeds, the motor was operated with unbalanced windings (i.e., unbalanced physical turns).

While the operation of a motor with unbalanced windings did not pose any significant problems at any of its normal operating speeds, it was not practical to readily convert such unbalanced, multiple speed non-reversible motors for reversible operation utilizing a motor reversing switch which reversed the connection of the leads to the main windings. In most instances, it was necessary to open up the motor housing and to add an additional lead wire which required a considerable expenditure of time and money to convert "non-reversible" motors to reversible motors.

There has been a long standing need for apparatus or means which can be readily added to a multiple speed, non-reversible motor so as to convert the motor to a multiple speed, reversible electric motor.

SUMMARY OF THE INVENTION

Among the several objects and features of the present invention may be noted the provision of means for readily converting a multiple speed, non-reversible motor into a multiple speed, reversible motor without the requirement of additional lead wires and without the requirement of having to open up the motor housing or changing the connection of the windings internally of the motor housing;

The provision of such means in the form of a kit which may be readily retrofitted to existing "non-reversible" motors;

The provision of such means which may be readily adapted to a number of motors and in which the speed of operation of the motor and any of its operating modes may be readily, selectively varied; and The provision of such means which is of relatively low cost and which is reliable in operation.

Other objects and features of this invention will be in part apparent and in part pointed out hereinafter.

Briefly, this invention relates to a permanent split capacitor motor having a stator including an auxiliary winding and a main winding. The main winding has at least two portions thereof with a tap point therebetween. A run capacitor is provided in series with the auxiliary winding, this run capacitor being located externally of the stator and of the windings. A multiple position speed selector switch is provided for controlling the speed of the motor and energization/de-energization of the motor. The speed selector switch has a movable switch member, a first terminal and a second terminal. The motor is operable at high speed when only one of the main windings is energized and is operable at a slower speed when the other of the main winding portions is energized in series with the one main winding portion. The motor has a plurality of leads extending externally of the stator including a first power lead connected to the auxiliary and main windings, a second lead connecting to the auxiliary winding, a third lead connected to one of the tap points with the run capacitor connected between the second and third leads. A fourth lead is connected to the main winding and to one of the speed selector switch terminals. A fifth lead is connected to the tap point with the speed selector switch having a second power lead and to the other terminal of the speed control switch. A sixth power lead is connected to the movable switch member of the speed selector switch for selected electrical connection with the fourth and fifth leads for respective operation of the motor in its high or slower speed modes of operation. More specifically, this invention relates to a reversing switch exteriorally mounted with respect to the motor, the reversing switch having a movable switch member and a pair of terminals. The first and second terminals of the speed selector switch are connected to the movable switch member of the reversing switch. A speed control capacitor is connected in series with one of the terminals of the speed selector switch and the movable switch member of the reversing switch for operation of the motor at a speed slower than when the speed control capacitor is not in series with the main windings of the motor. The run capacitor is reconnected exteriorally of the motor so as to be connected in parallel between the second and fourth leads. The reversing switch has one of its terminals connected to its fourth lead, and its other terminal is connected to the second lead whereby with power supplied by the speed selector switch to the reversing switch, and with the reversing switch in one of its operating positions, the auxiliary and run capacitors are in series with one another, and the main windings are in series such that the motor operates in one direction, and whereby with the reversing switch in its other position, the main windings and the run capacitor are in series such that the motor operates in the opposite direction.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
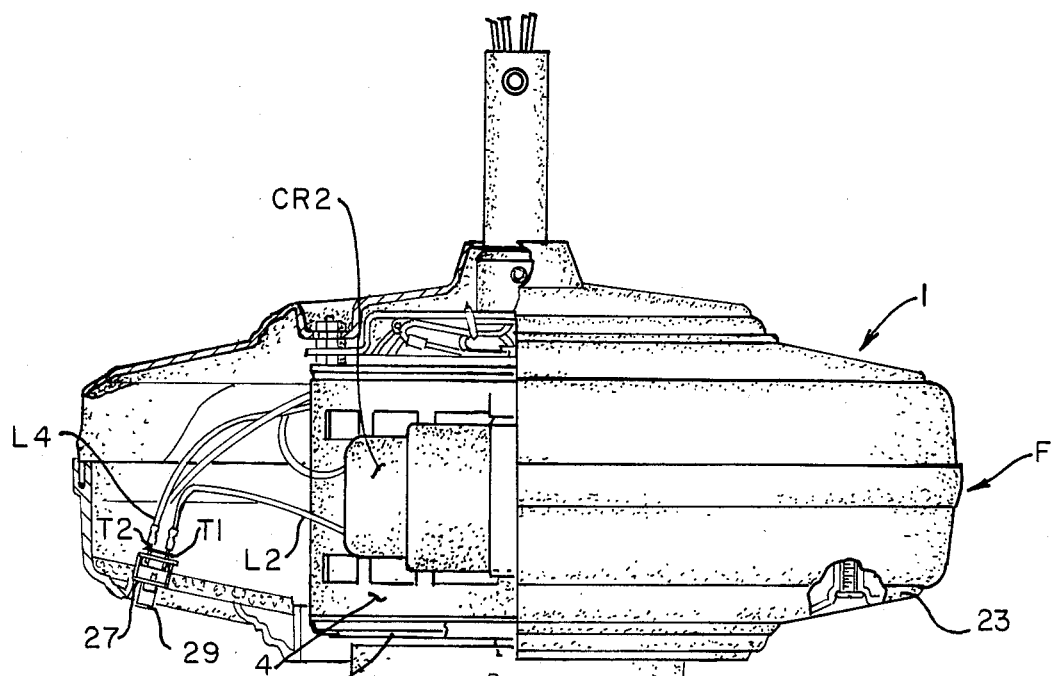
FIG. 1 is a part cross sectional view of an overhead ceiling fan and ceiling fan motor, with portions of the housing surrounding the ceiling fan motor broken away, and with portions of the switch housing positioned below the rotatable hub of the ceiling fan being broken away to show parts located therewithin.

Referring now to the drawings, an overhead ceiling fan is indicated in its entirety in FIG. 1 by reference character F. Generally, ceiling fan F includes a fan motor 1 having a stator assembly 3 enclosed within a shell or housing 4. The motor has endshields 5 at each end of shell 4, and a rotor assembly 7 is journaled in the endshields for rotating within the stator assembly. The rotor assembly includes a rotor shaft 9 which extends endwise from the lower endshield, and which has a hub 11 mounted thereon. A plurality of paddle fan blades (not shown) may be secured to the hub for rotation therewith. Typically, rotor shaft 9 is hollow and has a wire raceway 12 extending axially therethrough, with the wire raceway extending below hub 11 and being stationarily mounted relative to the stator assembly, such that the wire raceway does not rotate with the rotor shaft or with the hub. A switch housing, as generally indicated at 13, is secured to the lower end of wire raceway 12 by means of a securement nut 14. A speed selector switch 15 is mounted within switch housing 13, the speed selector switch being selectively operable by means of a chain pull 17. A plurality of electrical leads 19, extending from the windings of motor 1 and from a source of AC power, are connected to switch 19 and to the windings of the motor for desired multiple-speed operation of the motor. As is typical, fan motor 1 is enclosed within a decorative fan motor housing, as indicated at 23.

Figure 3:
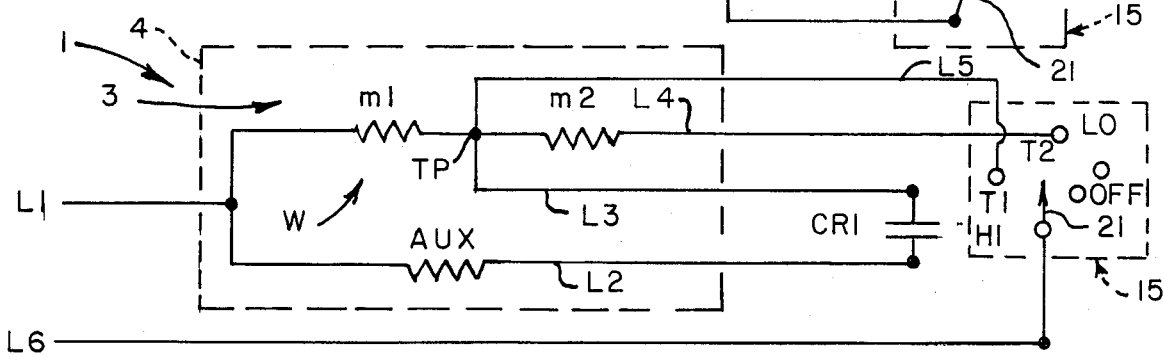
FIG. 3 is an electrical schematic of the motor shown in FIG. 2, prior to its being modified in accordance with the present invention.

Referring now to FIG. 3, motor 1 is shown to include electrical windings W, comprising a plurality of coils or the like of suitable magnet wire, inserted into slots within the stator core. The particular motor shown in FIG. 3 has a main winding, comprising two main winding coil sets, as indicated at M1 and M2. Winding W further includes an auxiliary winding AUX, inserted into the stator slots of the core. The particular motor shown in FIG. 3 is a permanent split capacitor (PSC) motor, and it includes a run capacitor CR1 connected in series with auxiliary winding AUX, and connected in parallel to the main winding. A tap point TP is provided between main windings M1 and M2 for selective energization of only main winding M1 for high speed operation of the motor, or for the series energization of both main windings M1 and M2 for a slower or second speed mode of operation. Speed control selection and on/off control for motor 1 is selectively effected by means of speed control switch 15, with the speed control switch including a selectively movable switch member 21, movable between switch terminal points T1 and T2, and an open or off position.

Typically, motor 1 is energized by 110 volt alternating current supplied by power lead lines L1 and L6. More specifically, power lead L1 is referred to as a first power lead, which is connected to both the main winding and to the auxiliary winding. A second lead wire L2 is connected from the opposite side of auxiliary winding AUX to run capacitor CR1. The opposite side of the run capacitor is connected to tap point TP by means of a third lead L3. The side of the second main winding M2 opposite the connection of lead L1 is connected to one of the terminals (e.g., terminal T2) of speed selector switch 15 by means of a fourth lead wire L4. Tap point TP, between main windings M1 and M2, is connected to another terminal T1 of switch 15 by a fifth lead wire L5. Lastly, movable switch member 21 of switch 15 is connected to the opposite side of the AC power source by a sixth power lead L6.

In operation, the prior art motor 1, as shown in FIG. 3, operates in low speed with switch selector member 21 in the position shown in FIG. 1 so as to complete a circuit between power input lead L6 and terminal T2 of speed selector switch 15 so as to connect both main windings M1 and M2 in series with the opposite side of the AC power source (i.e., lead L1). Upon moving selector member 21 so as to be in contact with terminal T1, electrical power from lead L6 is supplied to tap point TP via lead L5 thereby removing the second main winding M2 from the circuit such that only main winding M1 and the auxiliary winding AUX are energized so as to result in high speed operation of the motor. As thus far described, motor 1 is a conventional multiple-pole two-speed capacitor run motor which is non-reversible (i.e., its rotor operates in the same direction, for example, clockwise, in all of its operating modes).

In accordance with the present invention, means, as generally indicated at 25, is provided for converting motor 1, as shown in FIG. 3, from a non-reversible multi-speed motor to a reversible multi-speed motor without the requirement of changing any of the internal connections on the windings (i.e., connections within housing 4). More specifically, this reversible conversion means 25 comprises a reversing switch, as generally indicated at 27, which is preferably mounted within housing 23 at a convenient location, as shown in FIG. 1. Reversing switch 27 has a movable switch member 29 for connecting electrical power to terminals T1 or T2 of switch 27.

Figure 2:
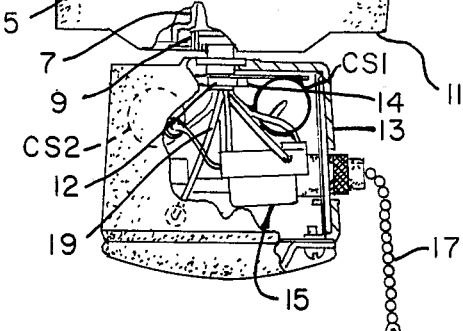
FIG. 2 is an electrical schematic of a two-speed, multiple-pole electric motor of a "non-reversible"-type, equipped with means of the present invention for permitting reversal of the direction of operation of the motor, and for permitting multiple-speed operation thereof.

As shown in FIG. 2, leads L3 and L5 are disconnected from the run capacitor and from switch 15 (as shown in FIG. 3), and are insulated by suitable wire nuts WN or the like. It will be appreciated that leads L3 and L5 are not necessary for operation of the motor in accordance with the present invention. Additionally, lead L4, which was heretofore connected to terminal T2 of switch 15 as shown in FIG. 3, is reconnected to one side of the run capacitor CR2. Further, lead L2 is connected to the other side of run capacitor CR2 and is also connected to terminal T2 of reversing switch 27.

Reversing means or kit 25 is shown to comprise another lead L7 connected to terminal T1 of switch 15, and connected to the input terminal of switch 27 so as to supply electrical power to reversing switch arm 29. Still, another lead L8 interconnects terminal T2 of switch 15 to switch arm 29 of switch 27. A so-called speed control condenser CS1 is connected in series in lead L8, and a bleed resistor R is interconnected between leads L7 and L8 for discharging speed control capacitor CS1 when the capacitor is not energized.

Speed control capacitor CS1 is incorporated in the circuit for the provision of speed control in the manner disclosed by the co-assigned U.S. Pat. No. 4,408,150, incorporated by reference herein, in which a capacitor is placed in series with the main winding of the motor, and which is selectively energized with the main windings of the motor so as to provide a slower speed of operation than when the main windings of the motor are energized without the speed control capacitor being energized. Those skilled in the art will recognize that another terminal and another speed control capacitor may be utilized in conjunction with speed control switch 15 so as to provide another speed of operation. Such an additional capacitor is indicated at SC2 in FIG. 1.

In operation, with switch member 21 of the speed control switch 15 moved to its high speed position, electrical power is supplied to terminal T1 of switch 15, which in turn supplies electrical power to the input terminal of reversing switch 27. With switch arm 29 of reversing switch 27 in the position shown in FIG. 2, auxiliary winding AUX and run capacitor CR2 are in series with one another, and the main windings M1 and M2 are in series with one another. The main windings, together with the run capacitor and the auxiliary winding, are connected in parallel, and thus result in operation of the motor in its high speed mode of operation in one direction of rotation (i.e., in clockwise direction). Upon moving switch arm 29 of reversing switch 27 from its position shown in FIG. 2 to its other position in which electrical power is supplied to terminal T2, it will be seen that run capacitor CR2 is placed in series with main windings M1 and M2, and further that the main windings M1 and M2 and run capacitor CR2 are connected in parallel to auxiliary winding AUX. In this manner, the motor 1 will operate in reverse direction in its high speed mode of operation. Further, if movable switch member 21 is moved to its low speed position, as shown in FIG. 2 in which electrical power is supplied to terminal T2, the main windings M1 and M2 are energized in series with speed control capacitor CS1, thus resulting in a slower speed mode of operation than described above. By selectively moving switch arm 29 of reversing switch 27 when speed control switch 21 is in its low speed position, the direction of rotation of motor 1 will be reversed while in its slow speed mode of operation.

Those skilled in the art will recognize that by providing reversing switch 27 and speed control capacitor CS1, and further by changing the value of the run capacitor CR2, motor 1 which, as heretofore explained, was manufactured to be a conventional non-reversible motor, can be converted or retrofitted so as to be a multiple-speed reversible motor without the necessity of changing any of the connections internally of housing 4. Instead, means 25 is an "add-on" retrofittable apparatus which permits already manufactured non-reversible motors to be readily converted to reversible motors.

In view of the above, it will be seen that the other objects of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

What is claimed is:

1. In a capacitor run motor having a stator including an auxiliary winding and a main winding, said main winding having at least two main winding portions with a tap point therebetween, a run capacitor connected to said main and auxiliary windings, said run capacitor being located externally of said stator and externally of said windings, and a multiple-position speed selector switch for controlling the speed of the motor and for energization/de-energization of the motor, said speed selector switch having a movable switch member, a first terminal and a second terminal, said motor being operable at high speed when only one of said main winding portions is energized, and being operable at a slower speed mode of operation when others of said main winding portions are energized in series with said one main winding portion, said motor having a plurality of leads extending externally of said stator, including a first power lead connected to said auxiliary and main windings, a second lead connected between said auxiliary winding and one side of said run capacitor, a third lead connected between the other side of said run capacitor and one of said tap points, a fourth lead connected to said main winding and to one of said speed selector switch terminals, a fifth power lead connected between said tap point and to the other of said terminals of said speed selector switch, and a sixth power lead of said speed selector switch for supplying electrical power thereto, wherein the improvement comprises: a reversing switch mounted exteriorly with respect to said motor, said reversing switch having a movable switch member and a pair of terminals, said first and second terminals of said speed selector switch being connected to said movable switch member of said reversing switch, a speed control capacitor in series with one of said terminals of said speed selector switch and said movable member of said reversing switch for operation of the motor at a slow speed mode of operation, said run capacitor being connected exteriorly of said motor so as to be connected in parallel between said second and fourth leads, said reversing switch having one of its terminals connected to said fourth power lead, and its other terminal connected to said second power lead whereby with power supplied by said speed selector switch to said reversing switch, and with said reversing switch in one of its operating positions, said auxiliary winding and said run capacitor are in series with one another, and said main windings are in series such that said motor operates in one direction, and whereby with said reversing switch in its other position, said main windings and said run capacitor are in series such that said motor operates in the opposite direction.

2. In a motor as set forth in claim 1 wherein the capacitance value of the run capacitor is changed so as to result in a desired speed of operation of said motor in its high speed mode of operation.

* * * * *